E. KEMPSHALL.
TIRE FOR VEHICLE WHEELS.
APPLICATION FILED JULY 25, 1907.

906,804.

Patented Dec. 15, 1908.

Witnesses

Inventor
E. Kempshall

Attorney

UNITED STATES PATENT OFFICE.

ELEAZER KEMPSHALL, OF LONDON, ENGLAND, ASSIGNOR TO KEMPSHALL TYRE COMPANY, OF EUROPE, LIMITED, OF LONDON, ENGLAND.

TIRE FOR VEHICLE-WHEELS.

No. 906,804.     Specification of Letters Patent.     Patented Dec. 15, 1908.

Application filed July 25, 1907. Serial No. 385,514.

*To all whom it may concern:*

Be it known that I, ELEAZER KEMPSHALL, a citizen of the United States of America, and residing at the Hotel Russell, Russell Square, London, England, have invented certain new and useful Improvements in and Connected with Tires for Vehicle-Wheels, of which the following is a specification.

This invention relates to tires for vehicle wheels and particularly to the type of tire wherein a number of alternately arranged elastic and non-elastic sections are vulcanized within an elastic covering or envelop.

The object of the present invention is to increase the resiliency of the tire and to prevent spreading at the tread and it consists, briefly stated, in using for the comparatively non-elastic sections a material which will give the required bracing effect but which is not absolutely rigid and in combining with a tire so formed a number of layers of fabric in the tread suitably arranged to prevent spreading.

Figure 1:
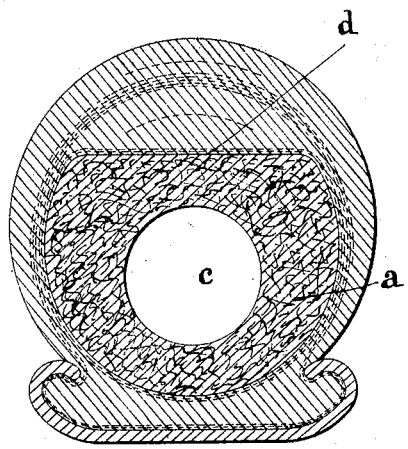
Figure 2:
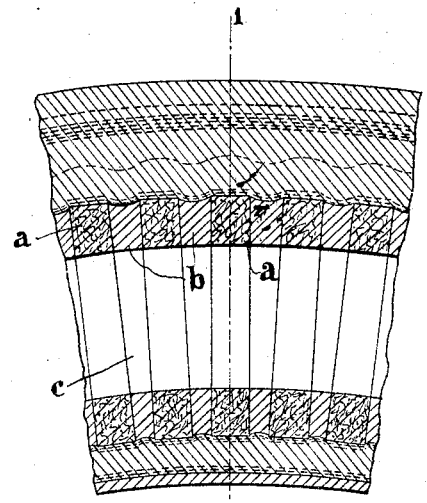
Figure 3:
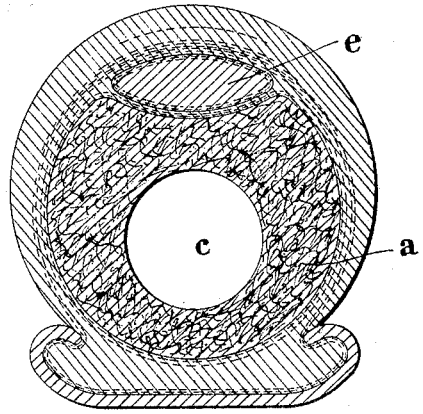

In the accompanying drawings, Figure 1 shows a cross section of the improved tire such section being taken on the line 1—1 of Fig. 2, Fig. 2 is a circumferential section of a portion of the same, and Fig. 3 is a cross section of a slightly modified form of tire.

In carrying out the invention according to one mode the comparatively non-elastic sections are stamped out of material such as employed for what is known as "rubber belting," that is, a material comprising layers of rubber or the like and fabric vulcanized together. This material is comparatively non-elastic or firmly resists compression applied in a direction parallel to the rubber layers, but is to a certain extent flexible under transverse stresses. As shown in Fig. 2, the sections, $a$, of this material are alternately arranged with similar sections, $b$, of elastic material, *i. e.*, rubber. The whole is then inclosed within a rubber covering and vulcanized.

The shape of the sections may be varied, and as shown, they may be formed with large coincident holes, $c$, to form a continuous interior.

It is preferred to make the sections somewhat flat opposite the tread, as indicated at $d$, and then to place around this portion, when the sections, $a$ and $b$, are in position, alternate layers of rubber and fabric, as shown in Fig. 1, or first to apply a cushion, $e$, (see Fig. 3), of rubber of segmental cross-section inclosed in or strengthened with fabric and over the whole to apply the rubber and fabric covering. The complete tire is, of course, vulcanized. In this way a rounded tread may be obtained capable of resisting spreading.

Having now described my invention, what I claim as new and desire to secure by Letters Patent is:—

1. A tire comprising two sets of transversely arranged sections having flattened outer edges, one set of said sections, being of composite formation including rubber and fabric vulcanized together, the fibers of the fabric adhering to the adjacent rubber, the two sets of sections being alternately disposed, alternate layers of rubber and fabric over said flattened portions and the whole vulcanized.

2. In a tire for vehicle wheels, elastic sections alternately arranged with sections of a material comprising layers of elastic material and fabric vulcanized together, the fibers of the fabric adhering to the adjacent elastic portions, and coincident holes in the sections forming a continuous hollow interior and the whole vulcanized.

3. A tire composing transversely arranged elastic sections alternately arranged with transverse sections of composite material comprising layers of elastic material and fabric vulcanized together, the fibers of the fabric adhering to the adjacent elastic material, and a cover vulcanized to all the sections.

In testimony whereof I have signed my name to this specification in the presence of two subscribing witnesses.

ELEAZER KEMPSHALL.

Witnesses:
ALBERT E. PARKER,
HERBERT R. KERSLAKE.